Patented Aug. 7, 1928.

1,680,059

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

BEVELING AND SEALING CLAMP.

Application filed July 24, 1925. Serial No. 45,899.

In the manufacture of rubber tubes, such as inner tubes for automobile tire casings, it is customary to vulcanize the rubber tube on a smooth mandrel while its ends are sealed to the mandrel either by tape or by a metallic clamp. If the tube is to be spliced into endless form it has also been proposed to do the skiving of the ends, necessary for a satisfactory splice, by means of a suitable shaping of these metal clamps. My present invention relates to clamps of this character, combining preferably both the sealing and skiving functions, and has for its objective the improvement of existing clamps in certain particulars, of which those set forth below are of perhaps the most importance, and also the improvement of methods of making tubes. One object is to substantially eliminate the vulcanization of excess material on the ends of the tube, permitting on the contrary the removal of this excess material prior to vulcanization and consequently at a time when this material may be utilized without undergoing the process of reclaiming. Another object is to facilitate the positioning of the clamp with accuracy upon the mandrel, so that tubes of exact length may be produced. Another object is to provide a clamp which may be applied to the mandrel by mechanical means. Another object is to provide a clamp which will of itself skive the tube and trim it accurately to length. Another object is to provide a clamp which, while of rigid construction, will accommodate small variations in the size of the tube mandrels.

Although the fundamentals of the invention may be given various forms, I have described the preferred way of constructing such a clamp in the accompanying drawings, in which Fig. 1 is a view of a mandrel with an uncured rubber tube thereon, ready for the application of a clamp;

Fig. 3 is a similar view showing the clamp fully applied;

Fig. 4 is a view similar to Fig. 3 but showing a clamp of this character adapted for use with circular mandrels; and Fig. 5 is a split end view of the mandrel and clamp, showing at the left the clamp in process of application, and at the right the clamp fully applied.

Figure 1:
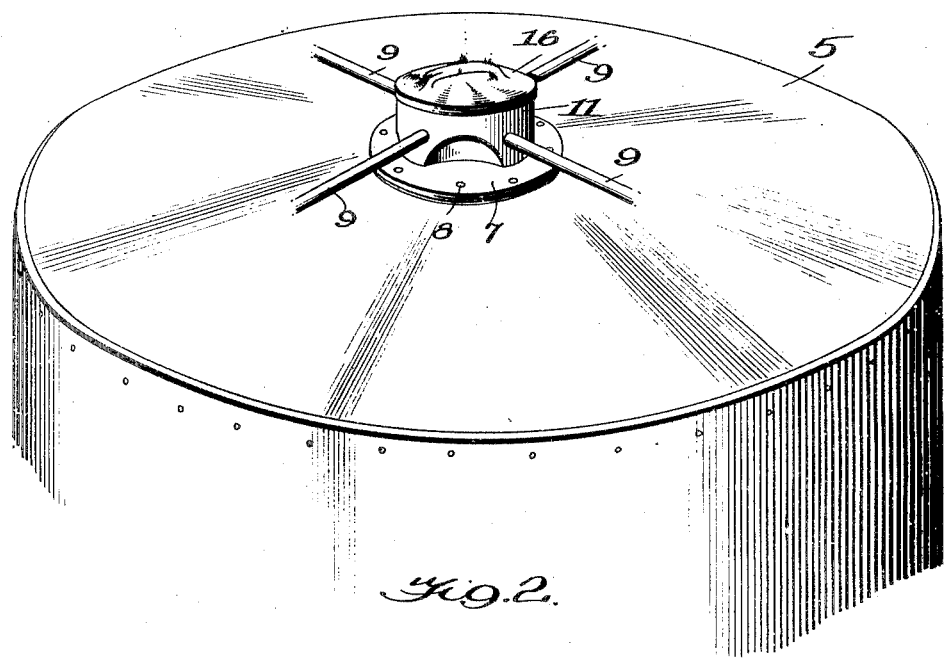
Figure 2:
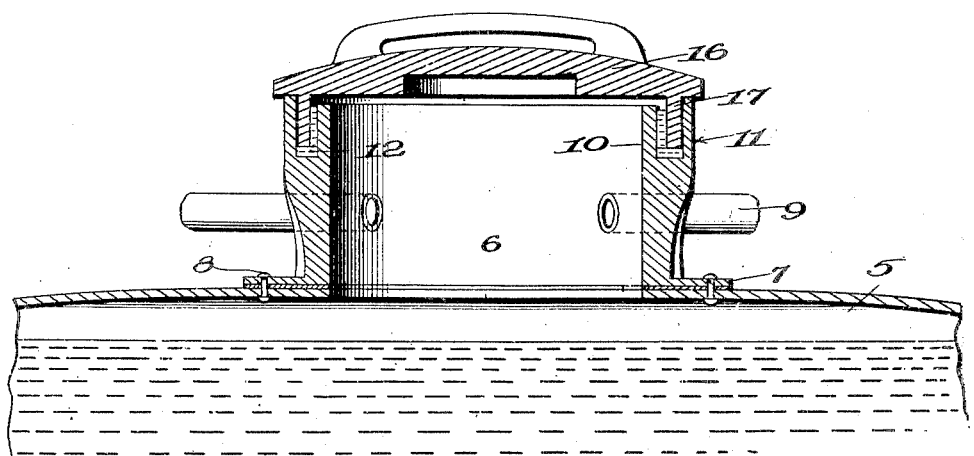
Fig. 2 is a half section of the mandrel and tube with a clamp in process of application.

The clamp in its preferred form comprises two mating semicircular halves 10 beveled internally at 11 to the angle desired for the skived surface of the tube. The smaller end 12 of these halves preferably has a lip 13, forming a shoulder 14 at one side and presenting an edge sufficiently acute to sever the raw rubber of the tube when the clamp is applied. The edge of the lip is made of the circumference of the outside of the mandrel. The outer surface of the halves is formed with a portion having a relatively acute taper 15, near the small end 12, adjoined by a portion 16 of a small driving taper of, for example, 0.625" per foot. Fitting snugly around the clamp halves when the clamp is fully assembled is a ring 17 whose inner surface is formed to the same taper as the portion 16. The mandrel 18 and the rubber tube 19 mounted thereon clearly appear from the drawings.

In use the two halves 10 are first assembled loosely around the tube, conveniently by a mechanical locating device although the clamp may be assembled readily by hand. The edges only of the clamp halves touch the rubber in this position, the remainder of the inner surface of the clamp arching away from the rubber. The ring 17 is now forced over the two halves, as by hydraulic or mechanical pressure, first contacting with the sharp taper 15 to start the clamp halves into position and then passing onto the gradual taper 16 to give an intensified although more gradual pressure. As the ring is forced home the surplus ruber is forced out and cut off both at the mating surfaces 20 of the two halves and along the lip 13. The mating surfaces of the clamp halves are cut away as at 21 to permit the escape of this material. When the clamp has been entirely closed these surfaces will be pressed firmly together, shearing off the extruded rubber caught between them and the lip 13 will be pressed against the mandrel to cut off any excess length of the rubber tube as originally placed on the mandrel. These pieces 22 of surplus rubber are preferably removed before vulcanization, since its value is much greater in the uncured state. The lip 13 per- Aug. 7, 1928.

A. E. NELSON 1,680,060

MANHOLE COVER FOR OIL TANKS

Filed March 15, 1926

INVENTOR
A.E.NELSON,
BY
ATTORNEYS